United States Patent [19]

Irie et al.

[11] Patent Number: 5,644,409
[45] Date of Patent: Jul. 1, 1997

[54] SHADING CORRECTING METHOD AND SHADING CORRECTING APPARATUS FOR USE IN IMAGE FORMING APPARATUSES

[75] Inventors: Atsuhiko Irie; Ariyoshi Hikosaka; Tetsuji Kajitani, all of Osaka, Japan

[73] Assignee: Mita Industrial Co., Ltd., Osaka, Japan

[21] Appl. No.: 367,887

[22] Filed: Jan. 3, 1995

[30] Foreign Application Priority Data

Jan. 13, 1994 [JP] Japan .................................. 6-002200
Jan. 14, 1994 [JP] Japan .................................. 6-002831

[51] Int. Cl.$^6$ ...................................................... H04N 1/40
[52] U.S. Cl. .......................... 358/461; 358/464; 382/274
[58] Field of Search .................................. 358/461, 464, 358/466, 455, 448, 465, 456, 462, 463, 516; 382/273, 274; 348/251, 615

[56] References Cited

U.S. PATENT DOCUMENTS

| 4,691,240 | 9/1987 | Kurusu et al. | 358/464 |
| 4,806,780 | 2/1989 | Yamamoto et al. | 358/461 |
| 4,807,045 | 2/1989 | Shimano | 358/461 |
| 4,903,144 | 2/1990 | Stefanik et al. | 358/461 |
| 5,038,225 | 8/1991 | Maeshima | 358/461 |
| 5,084,772 | 1/1992 | Shimoyama | 358/461 |
| 5,146,351 | 9/1992 | Maehara | 358/461 |
| 5,181,118 | 1/1993 | Kimura | 358/461 |
| 5,317,421 | 5/1994 | Ito | 358/464 |
| 5,325,210 | 6/1994 | Takashima et al. | 358/461 |
| 5,414,535 | 5/1995 | Kanmoto et al. | 358/487 |
| 5,500,745 | 3/1996 | Iishiba et al. | 358/461 |
| 5,572,337 | 11/1996 | Kajitani et al. | 358/461 |

*Primary Examiner*—Edward L. Coles, Sr.
*Assistant Examiner*—Kimberly A. Williams
*Attorney, Agent, or Firm*—Beveridge, Degrandi, Weilacher & Young, LLP

[57] ABSTRACT

There is provided an apparatus capable of correcting a threshold value for a white reference value and a white reference value correcting value if a white reference plate becomes dirty to calculate a white reference value corresponding to the dirt of the white reference plate and consequently, capable of making good shading correction using the white reference value. If the density value of any one of pixels of line data is higher than a threshold value WMAX1, the threshold value WMAX1 is made high, and a white reference value correcting value WDN is made high. As a result, even if the white reference value is corrected when the white reference plate becomes dirty as a whole, only a value obtained by the correction is not extremely low because the white reference value correcting value is high, thereby to make it possible to obtain a suitable white reference value. Accordingly, shading correction based on a good white reference value can be made, thereby to make it possible to obtain a good shading-corrected image.

11 Claims, 8 Drawing Sheets

SHADING CORRECTING METHOD AND SHADING CORRECTING APPARATUS FOR USE IN IMAGE FORMING APPARATUSES

BACKGROUND OF THE INVENTION

1. Field of the Invention

The present invention relates to a shading correcting method and a shading correcting apparatus for reducing nonuniformity in the density of a read image in an image reading apparatus such as a facsimile or an image scanner.

2. Description of the Related Art

In an image reading apparatus such as a facsimile or an image scanner, so-called shading correction is made so as to compensate for nonuniformity in the density between pixels due to, for example, nonuniformity in illumination of a light source for reading. In the shading correction, digital data obtained by converting an output analog signal of the image sensor using an analog-to-digital converter (hereinafter referred to as "A/D converter") is subjected to correction based on the following expression (1):

$$\text{(data after correction)} = \frac{\text{(input data)} - \text{(white reference value)}}{\text{(black reference value)} - \text{(white reference value)}} \times K \quad (1)$$

where $K$ is a constant, which is usually the number of gray levels.

In the expression (1), a "black reference value" is a value in a case where a pixel signal outputted from the image sensor is converted into digital data when a deep black reference image is read, and a "white reference value" is a value in a case where a pixel signal outputted from the image sensor is converted into digital data when a pure white reference image is read. For example, the black reference value can be obtained by turning a light source for reading of the image sensor off to cause the image sensor to perform a reading operation, and the white reference value can be obtained by turning the light source for reading on to cause the image sensor to read a white reference plate.

The basic construction for making shading correction is shown in FIG. 7. Specifically, the difference between a white reference value WST and a black reference value BST (WST−BST) is operated by a subtracter 151. In addition, the difference between input data ID and the black reference value BST (ID−BST) is operated by a subtracter 152. Respective outputs of the subtracters 151 and 152 are applied to a divider circuit 153, where output data of the subtracter 152 (ID−BST) is divided by output data of the subtracter 151 (WST−BST), to obtain correction data.

In the above described shading correction, the minimum value of the input data is the white reference value. When the white reference value is higher the minimum output of the A/D converter, therefore, the dynamic range of the correction value is narrowed. For example, if the white reference value is "0000111" even if the A/D converter has data which is seven bits in depth, the correction data can be only substantially changed in the range of four bits. Therefore, the resolution of the density is decreased, so that the density can be represented only at a small number of gray levels.

In order to solve the disadvantage of the conventional technique, a shading correcting method and a shading correcting apparatus which allow a representation of the density at a lot of gray levels by widening the dynamic range of correction data have been invented by the applicant of the present application and disclosed in a patent application (U.S. patent application Ser. No. 08/089,379).

In the shading correcting method according to the prior application, shading correction is made in accordance with the following expression (2) using a predetermined offset OFFSET (preferably, OFFSET=white reference value):

$$\text{(data after correction)} = \quad (2)$$

$$\frac{\text{(input data)} - \text{(white reference value)} - \text{(OFFSET)}}{\text{(black reference value)} - \text{(white reference value)} - \text{(OFFSET)}} \times K$$

where $K$ is a constant, which is usually the number of gray levels.

In the shading correcting method according to the prior application, the offset OFFSET is subtracted from a dividend and a divisor in an division operation executed at the time of the correction. Therefore, if the white reference value takes not the minimum value "0000000" but a value higher than the minimum value which can be inherently taken, for example, "0000111" in a case where the A/D converter has data which is seven bits in depth, for example, the offset OFFSET is subtracted from the white reference value, thereby to make it possible to make such correction that the density is represented by 7 bits. As a result, the dynamic range of the data after the correction can be widened in a predetermined direction (toward the white side in the above described case), whereby the density can be represented at a lot of gray levels.

As a premise of the shading correction based on the foregoing expression (2), the black reference value and the white reference value must be normal values. The black reference value and the white reference value are respectively a value read in a state where the white reference plate is not illuminated and a value read in a state where the white reference plate is illuminated, as described above. If the white reference plate partially becomes dirty, however, the reference value and particularly, the white reference value in the dirty portion becomes high, thereby to make it impossible to obtain a normal white reference value. As a method of solving such a problem, a method of previously determining a certain threshold value and setting, if a white reference value is not less than the threshold value, the read white reference value to a predetermined value is considered.

More specifically, description is made with reference to the drawings.

In FIG. 8, reference numeral 141 denotes a white reference plate. A direction indicated by an arrow 142 shall be the direction of reading (the direction of horizontal scanning) by a line image sensor. In this case, if the white reference plate 141 is not dirty at all, digital data obtained by converting outputs of the line image sensor obtained in a state where the white reference plate 141 is illuminated become data of a plurality of pixels as indicated in a row A. The reason why the data of each of the pixels in the row A is not at a complete white level (the density is 00h) is that there are nonuniformity in illumination of a light source for reading and variation in the outputs of the line image sensor.

If the white reference plate 141 partially becomes dirty, for example, dirt adheres to an area 143, the density level of a pixel 144 corresponding to the area 143 becomes high. In this case, a method of previously determining a certain threshold value WMAX and setting not an output value of the line image sensor but a predetermined low value WDN as a white reference value with respect to a pixel whose density level is higher than the threshold value WMAX is considered. Even if the white reference plate 141 partially becomes dirty, therefore, the dirt does not affect the white reference value, thereby to make it possible to make good shading correction.

Thin dirt may, in some cases, adhere to the whole of the white reference plate 141 as the white reference plate 141 is used in addition to the above described case where the white reference plate 141 partially becomes dirty. In such a case, white reference values of pixels obtained by reading the white reference plate 141 become high as a whole. For example, data of a plurality of pixels as indicated in a row B in FIG. 8 are obtained. The reason why the density levels of the pixels in the row B are high as a whole is that thin dirt adheres to the whole of the white reference plate 141. In such a case, if the density level of a certain pixel 145 exceeds the set threshold value WMAX, the white reference value of the pixel 145 is set to a low value WDN. Consequently, the white reference value becomes very low only with respect to a pixel whose density level exceeds the threshold value WMAX. That is, only the white reference value of a pixel whose density level exceeds the threshold value WMAX becomes extremely lower than the white reference values of the other pixels. If shading correction is made on the basis of such a white reference value, a pixel whose white reference value becomes extremely low becomes black, whereby a black stripe extending in the direction of vertical scanning appears in an output image.

The black stripe thus appears in the output image by shading correction for making the output image good, thereby to make it impossible to make good shading correction.

Furthermore, if the shading correction is made in consideration of the offset OFFSET as described above, the dynamic range of data after the correction is widened. In this case, however, the dynamic range cannot be arbitrarily widened toward the black side or the white side. In the related art, therefore, an obtained image cannot be freely changed to an image inclined toward the white side or an image inclined toward the black side.

SUMMARY OF THE INVENTION

Therefore, an object of the present invention is to provide a shading correcting apparatus so adapted as to correct a threshold value WMAX for correcting a white reference value and also correct a white reference value correcting value WDN depending on the dirt of a white reference plate when white reference values are produced and suitably correct, when the white reference values become high in level as a whole, the white reference value depending on the high level, thereby to make it possible to make good shading correction.

Another object of the present invention is to provide a shading correcting method and a shading correction apparatus which allow a representation of the density to be freely shifted toward the black side or the white side or allow the number of gray levels on the black side or the number of gray levels on the white side in the density representation to be increased besides allowing a representation of the density at a lot of gray levels in subjecting input data to shading correction, thereby to make it possible to obtain image data whose density is effectively and abundantly represented.

In accordance with a certain aspect of the present invention, a threshold value for producing a reference value (a low threshold value WMAX1 and a white reference value correcting value WDN) is corrected as required prior to producing a white reference value and a black reference value required at the time of shading correction.

Specifically, the density reference plate illuminated by illuminating means is read by line reading means, whereby the maximum value AGCMAX of outputted data of a plurality of pixels is detected. The maximum value AGC-MAX is compared with the low threshold value WMAX1 and a high threshold value WMAX2 which are previously held in holding means.

If the condition of WMAX1<AGCMAX<WMAX2 is satisfied as a result of the comparison, such correction is made that the low threshold value WMAX1 which is a basis for judging whether or not a white reference value should be corrected becomes higher and the white reference value correcting value WDN becomes higher.

Thereafter, the values of pixels read by the line reading means by illuminating the white reference plate are compared with the above described low threshold value WMAX1 for each pixel, whereby the value of the read pixel or the white reference value correcting value WDN is set as a white reference value.

Thus, the low threshold value WMAX1 which is a basis for judging whether or not a white reference value should be corrected is corrected depending on how the density reference plate is dirty, and the white reference value correcting value WDN is also corrected. Consequently, it is possible to produce the most suitable white reference value depending on how the density reference plate is dirty.

In accordance with another aspect of the present invention, a black reference value is also corrected, thereby to make it possible to produce the most suitable black reference value.

According to the above described aspect of the present invention, in a case where the density reference plate becomes dirty as a whole as it is used, for example, it is possible to correct a threshold value for judging whether or not a white reference value should be corrected as the density reference plate becomes dirty and a white reference value correcting value for correcting the white reference value. Therefore, the shading correcting apparatus according to the present invention can make good shading correction even if the density reference plate becomes dirty as it is used irrespective of the dirt.

According to still another aspect of the present invention, a shading correcting amount is found by a computing equation using a black reference value, a white reference value and an offset. The offset can be set to a value equal to or lower than the white reference value, for example. Even if the white reference value of the pixel read by the reading means is not the minimum value which can be read by the reading means, the difference can be absorbed by the offset. In addition, the difference can be positively increased using the offset. Accordingly, an image can be shifted toward the white side or the black side or the number of gray levels on the white side or the black side as required while maintaining the number of gray levels of the density of data which is subjected to shading correction by properly using computing equations.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

One embodiment of the present invention will be described in detail by taking a facsimile as an example.

Figure 1:
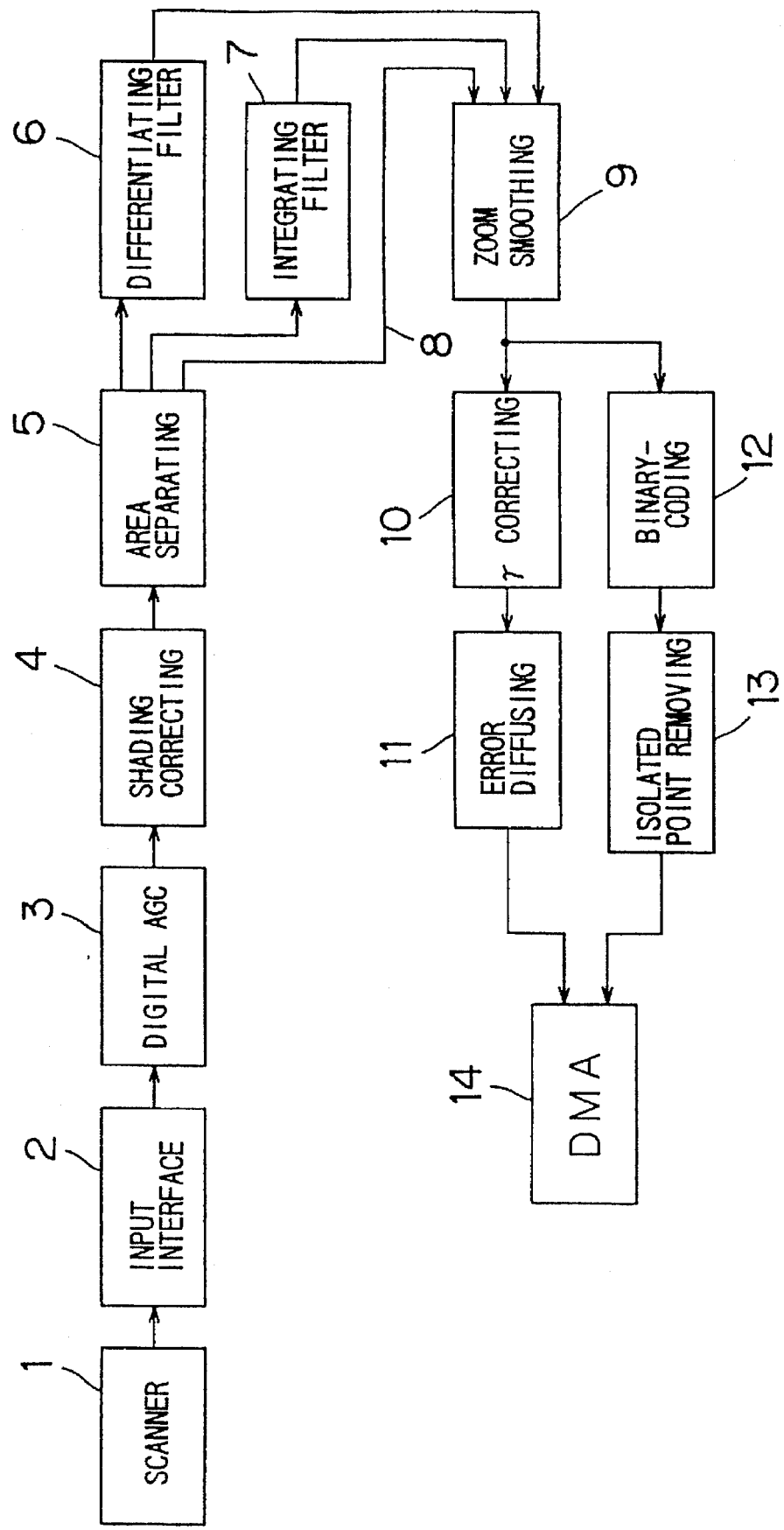
FIG. 1 is a block diagram showing the electrical construction of an image reading mechanism of a facsimile machine in which one embodiment of the present invention is incorporated.

FIG. 1 is a block diagram showing the electrical construction of an image reading mechanism of a facsimile machine in which one embodiment of the present invention is incorporated. Referring now to FIG. 1, image reading processing in the facsimile will be briefly described.

A document set on the facsimile is read by a scanner 1. The scanner 1 comprises an image sensor for reading an image, for example, a CCD image sensor or a CIS image sensor. The image sensor may be an area image sensor for reading two-dimensional data or a linear image sensor for reading line data. In order to construct the facsimile at low cost, the line image sensor is usually used.

Image data of the document read by the scanner 1 is applied to an input interface unit 2. In the interface unit 2, sample-hold processing of a signal, for example, is performed. The input interface unit 2 is constituted by an analog circuit in the present embodiment, and the above described processing is performed in an analog manner.

The image data processed by the input interface unit 2 is then applied to a digital AGC circuit 3. In the digital AGC circuit 3, gain control for causing the level of a signal (image data) to fall in a desired range, and the image data is converted from an analog signal to a digital signal.

The image data whose gain is controlled is then applied to a shading correcting circuit 4. In the shading correcting circuit 4, shading distortion is reduced or removed. The shading distortion is nonuniform in the density between pixels caused by nonuniformity in illumination of a light source for reading in a case where the document is read by the scanner 1.

The image data whose shading distortion is reduced or removed is then applied to an area separating circuit 5. In the area separating circuit 5, it is judged which of image data obtained by reading characters (character data), image data obtained by reading a picture (picture data) and image data in halftone obtained by reading an image of a printed picture, for example, a picture of a newspaper, a magazine or the like (halftone data) is the inputted image data.

If the character data, the picture data and the halftone data are present as a mixture in the inputted image data, areas of each of the data are separated.

The reason why the areas are thus separated depending on the type of data is that processing suitable for the type of data is performed in the subsequent processing.

A differentiating filter 6, an integrating filter 7 and a path through circuit (a circuit through which a signal is only passed without being subjected to processing) 8 are connected in parallel on the output side of the area separating circuit 5 so as to perform different processing depending on the type of data whose areas are separated. The character data whose areas are separated is applied to the differentiating filter 6, where the contour of the character data is made clear. The halftone data is applied to the integrating filter 7, where the data is smoothed. Further, the data other than the character data and the halftone data, that is, the picture data is applied to the path through circuit 8, and is directly sent to the succeeding circuit.

The image data is thus subjected to predetermined processing corresponding to the type or is subjected to no processing.

The data are applied to a zoom smoothing circuit 9. In the smoothing circuit 9, when an image is enlarged or reduced, the enlargement or reduction processing and processing for correcting the distortion of the image caused by the enlargement or reduction processing are performed. If the image is not enlarged or reduced, the image data is not subjected to any processing in the zoom smoothing circuit 9.

The image data after the processing in the zoom smoothing circuit 9 is then subjected to processing in any one of the following circuits depending on the type.

Specifically, if the image data is the picture data or the halftone data and is to be subjected to output processing for halftone, the image data is applied to a γ correcting circuit 10, where the sensitivity characteristics of the image data is compensated for so as to correspond to the human eyes. In addition, the image data is applied to an error diffusing circuit 11, where the image data is subjected to processing for good halftone representation.

On the other hand, if the image data is the character data and is to be subjected to binary-coding processing, the image data is applied to a binary-coding circuit 12. In the binary-coding circuit 12, a slice level for binary coding is adjusted, to divide a background and characters or lines, for example. At this time, automatic density adjustment processing is also so performed that the density becomes proper.

An output of the binary-coding circuit 12 is applied to an isolated point removing circuit 13, where isolated black and white points, for example, appearing due to noises or the like are removed.

The data through the foregoing processing are applied to a DMA (Direct Memory Access) circuit 14, after which the data are outputted to a transmitting circuit (not shown) or are outputted to a printing circuit.

The present embodiment is related to the shading correcting circuit 4 out of the above described image reading processing circuits.

Figure 2:
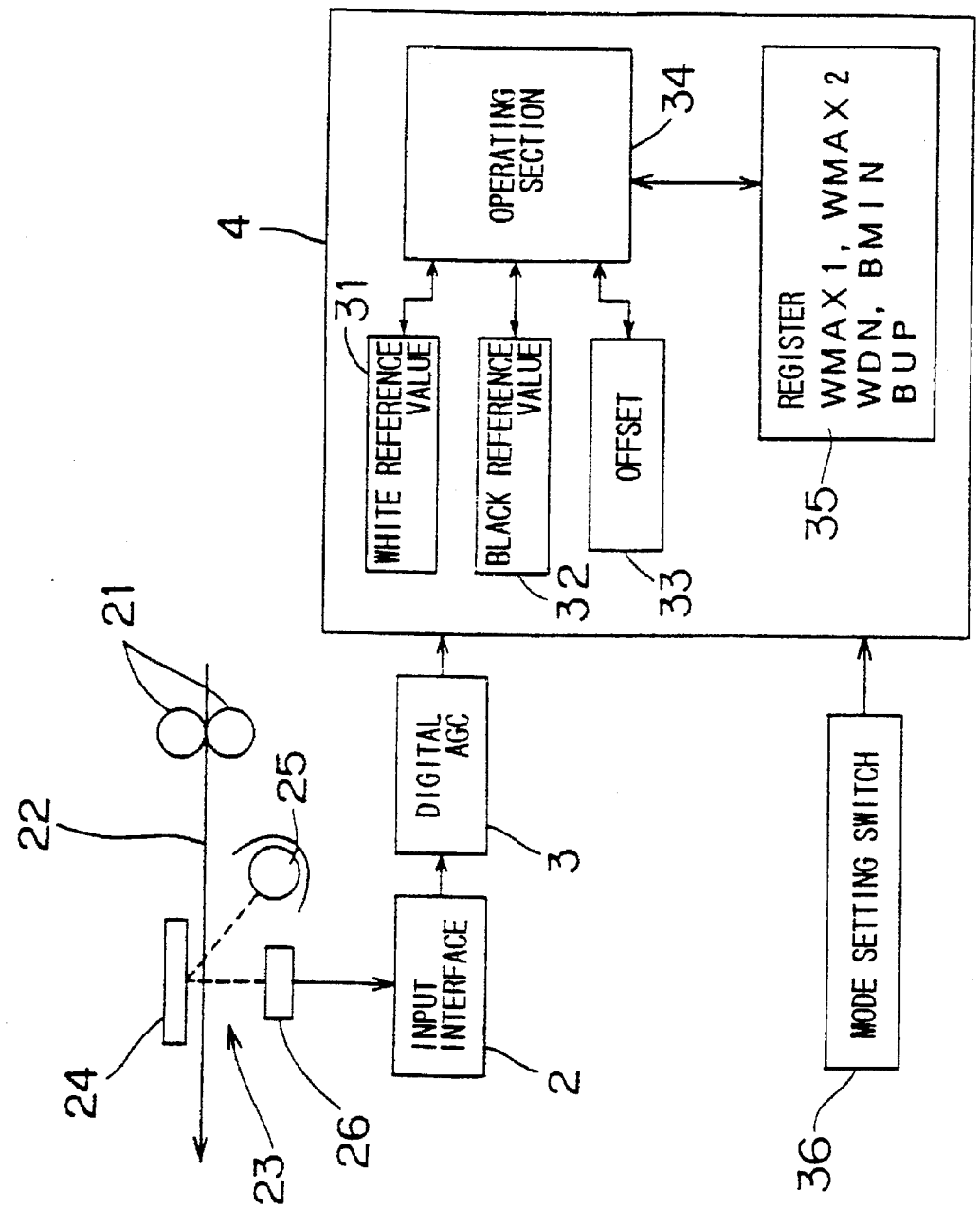
FIG. 2 is a block diagram for explaining a shading correcting circuit according to one embodiment of the present invention.

FIG. 2 is a diagram for explaining the construction of the shading correcting circuit 4 according to the present embodiment.

Description is made with reference to FIG. 2. In a facsimile employing the shading correcting circuit 4 according to the present embodiment, a predetermined position on a conveying path of a document conveyed by a roller 21 is a position for reading 23. A white reference plate 24 serving as a density reference plate extending in a direction orthogonal to the direction of conveyance of the document conveying path 22, for example, is arranged in the position for reading 23. Further, a lamp 25 for illuminating in the position for reading 23 the white reference plate 24 and the document conveyed on the document conveying path 22 and a line CCD 26 for reading the white reference plate 24 illuminated by the lamp 25 or the contents of the document in the position for reading 23 are arranged.

The image data read by the line CCD 26 is applied to the shading correcting circuit 4 according to the present embodiment through the input interface unit 2 and the digital AGC circuit 3 as described in FIG. 1.

The shading correcting circuit 4 comprises a white reference value storing register 31, a black reference value storing register 32, an offset storing register 33, a register 35 for storing values for correcting a reference value, and an operating section 34.

The operating section 34 can be constituted by a microcomputer, for example.

The operating section 34 can be also constituted by a hardware circuit using a subtracter, an adder, a divider and the like.

The following values, for example, are previously set in the register 35 for storing values for correcting a reference value:

WMAX1: a threshold value for judging whether or not a white reference value should be corrected (a low threshold value)

WDN: a white reference value correcting value

WMAX2: a threshold value for judging whether or not the low threshold value WMAX1 and the white reference value correcting value WDN should be corrected (a high threshold value)

BMIN: a threshold value for judging whether or not a black reference value is corrected BUP: a black reference value correcting value In the present embodiment, the low threshold value WMAX1 and the white reference value correcting value WDN out of the values are corrected depending on the dirt of the white reference plate 24, as described later.

A signal from a mode setting switch 36 is also applied to the shading correcting circuit 4. The mode setting switch 36 may be an adjusting switch operated by a service man or a switch operated by a user, for example. The switch 36 is used for applying a signal for selecting an arbitrary mode such as a mode in which a representation of the density of read image data is shifted toward the black side, a mode in which it is shifted toward the white side, and a mode in which the number of gray levels on the black side is increased.

Figure 3:
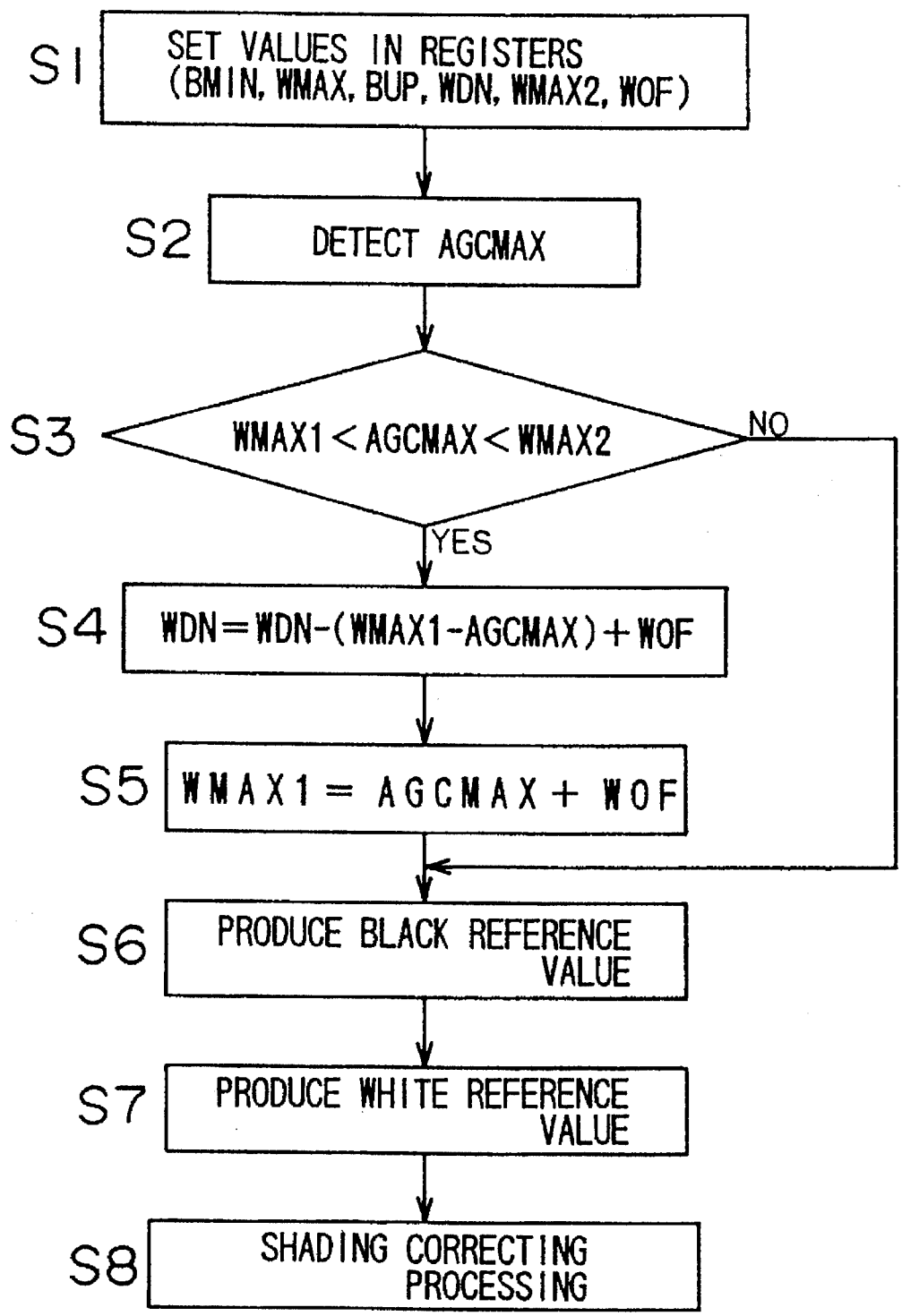
FIG. 3 is a flow chart for explaining one example of processing operations performed by the shading correcting circuit shown in FIG. 2.
Figure 4:
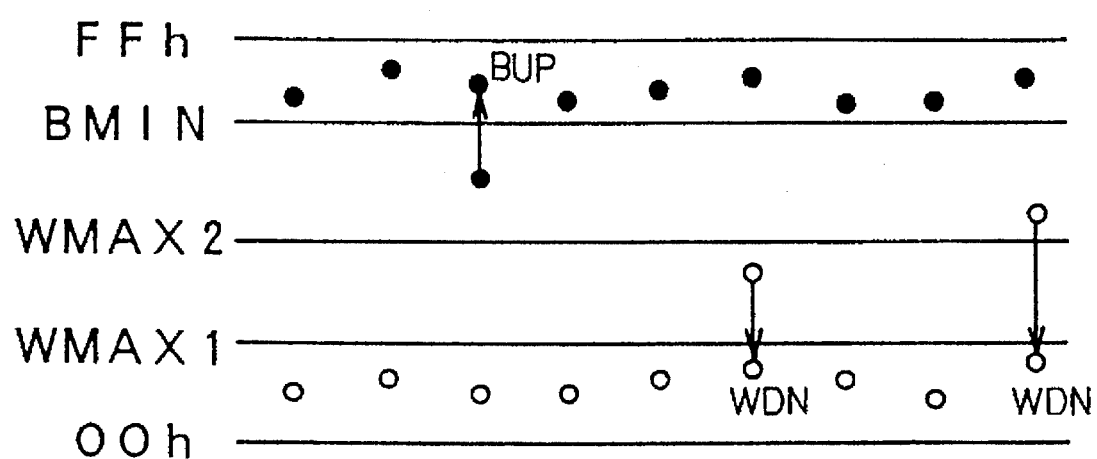
FIG. 4 is an illustration for explaining how black reference values and white reference values are produced.

FIG. 3 is a flow chart for explaining one example of operations performed by the shading correcting circuit 4 described in FIG. 2, and FIG. 4 is an illustration for explaining a method of producing black reference values and white reference values.

Referring now to FIGS. 2, 3 and 4, one example of operations performed by the shading correcting circuit 4 shown in FIG. 2 will be described.

First, the offset WOF, the low threshold value WMAX1, the high threshold value WMAX2, the white reference value correcting value WDN, the threshold value for a black reference value BMIN and the black reference value correcting value BUP which are held in the register 35 and the register 35 must be set (step S1). The values can be set by an input button or a DIP switch (not shown), for example. The offset WOF held in the register 35 out of the values may be an arbitrary value. The values may be set when the facsimile is first located.

Usual operations in the facsimile are operations in the step S2 and the subsequent steps. For example, a document to be transmitted is set, and a start button is depressed. Consequently, AGCMAX is first detected (step S2). Specifically, the white reference plate 24 is illuminated by the lamp 25. At that time, light reflected from the white reference plate 24 is read by the line CCD 26. A value obtained by the reading is applied to the shading correcting circuit 4 through the input interface 2 and the digital AGC circuit 3. In the operating section 34 in the shading correcting circuit 4, the maximum value of values of a row of applied pixels in the direction of horizontal scanning is detected as AGCMAX.

The detected maximum value AGCMAX is then compared with the low threshold value WMAX1 and the high threshold value WMAX2 which are set in the register 35 (step S3). As a result, if the maximum value AGCMAX is not more than the low threshold value WMAX1, it can be judged that the white reference plate 24 is not dirty, whereby the low threshold value, that is, the threshold value WMAX1 for judging whether or not a white reference value should be corrected and the white reference value correcting value WDN are not corrected.

On the other hand, if the maximum value AGCMAX is not less than the high threshold value WMAX2, it can be judged that the white reference plate 24 is not dirty as a whole but partially dirty. Also in this case, therefore, the low threshold value WMAX1 for judging whether or not a white reference value should be corrected and the white reference value correcting value WDN are not corrected.

On the other hand, if the maximum value AGCMAX is more than the low threshold value WMAX1 and is less than the high threshold value WMAX2, it can be judged that the white reference plate 24 is dirty as a whole. In this case, therefore, the low threshold value WMAX1 for judging whether or not a white reference value should be corrected and the white reference value correcting value WDN must be corrected depending on the dirt whole of the white reference plate 24.

In the steps S4 and S5, therefore, the white reference value correcting value WDN and the low threshold value WMAX1 are respectively corrected.

More specifically, the white reference value correcting value WDN is corrected by the following expression (3), for example, using the low threshold value WMAX1, the maximum value AGCMAX and the offset WOF with respect to the correcting value WDN before correction.

$$WDN \leftarrow (WDN-(WMAX1-AGCMAX)+WOF) \qquad (3)$$

If the white reference value correcting value WDN is corrected using the expression, the larger the dirt of the white reference plate 24 is, the higher the correcting value WDN is. Consequently, the white reference value of a corrected pixel is higher after the correction, thereby to make it possible to prevent the production of a black line, for example, if the high white reference value is used. The correcting value WDN may not be corrected on the basis of the foregoing expression (3) but corrected on the basis of the other expressions.

The low threshold value WMAX1 for judging whether or not a white reference value should be corrected is corrected on the basis of the following expression (4), for example:

$$WMAX1 \leftarrow (AGCMAX+WOF) \qquad (4)$$

If the maximum value AGCMAX is higher than the low threshold value WMAX1 in the step S3 by the correction using the expression (4), the low threshold value WMAX1 is corrected by the expression (4) so that the low threshold value WMAX1 is higher than the maximum value AGCMAX. The correcting value WMAX1 may be also corrected on the basis of expressions other than the foregoing expression (4).

In the above described manner, the respective values set in the register 35 are corrected as required on the basis of the maximum value AGCMAX.

Thereafter, a black reference value is produced (step S6). In producing the black reference value, the lamp 25 is turned off. In the state, reflected light from the white reference plate 24 is read. Since the white reference plate 24 is not illuminated, there is no reflected light from the white reference plate 24, whereby black reference data is obtained by the line CCD 26. The obtained data is processed in the input interface unit 2 and the digital AGC circuit 3, after which the processed data is stored as a black reference value in the black reference value register 32. In producing the black reference value, a black reference value for each pixel applied from the digital AGC circuit 3 is compared with the threshold value for a black reference value BMIN held in the register 35. If the value of each of the inputted pixels is lower than the threshold value BMIN, the value is replaced with the black reference value correcting value BUP set in the register 35 (see FIG. 4).

Black reference values are thus respectively set with respect to the pixels arranged in the direction of horizontal scanning.

The lamp 25 is then turned on to illuminate the white reference plate 24, and reflected light from the white reference plate 24 at the time it is read by the line CCD 26. Data obtained by the reading is processed in the input interface unit 2 and the digital AGC circuit 3, after which the processed data is stored as a white reference value in the white reference value register 31 (step S7). In this case, the value inputted from the digital AGC circuit 3 is compared with the low threshold value WMAX1 for judging whether or not a white reference value should be corrected which is set in the register 35 (this value WMAX1 may, in some cases, be a value first set in the register 35 or a value corrected in the foregoing step S5 in the other cases). The value is set as a white reference value if the value is lower than WMAX1, while the white reference value correcting value WDN (this value WDN may, in some cases, be also a value first set in the register 35 or a value corrected in the foregoing step S4 in the other cases) is set as a white reference value if it is higher than WMAX1.

In the above described manner, the black reference value and the white reference value of each of the pixels in the direction of horizontal scanning are set.

In setting the black reference value and the white reference value, it is preferable to incorporate not only data corresponding to one line but also data corresponding to a plurality of predetermined lines, for example, eight lines by the line CCD 26, find the average value of the data for each pixel, and compare the average value with BMIN or WMAX1 held in the register 35. The reason for this is that the black reference value and the white reference value are stabilized by using the average value of the line data.

After the black reference value and the white reference value are produced in the above described manner, image data is read, and the read image data is subjected to shading correction using the foregoing expression (2), for example (step S8).

Description was made of the embodiment in which the white reference value is taken as an example, and it is possible to correct the low threshold value WMAX1 for judging whether or not a white reference value should be corrected and the white reference value correcting value WDN. Similarly, it is also possible to correct the threshold value BMIN for judging whether or not a black reference value should be corrected and the black reference value correcting value BUP, which is not specifically described in the present embodiment.

Figure 5:
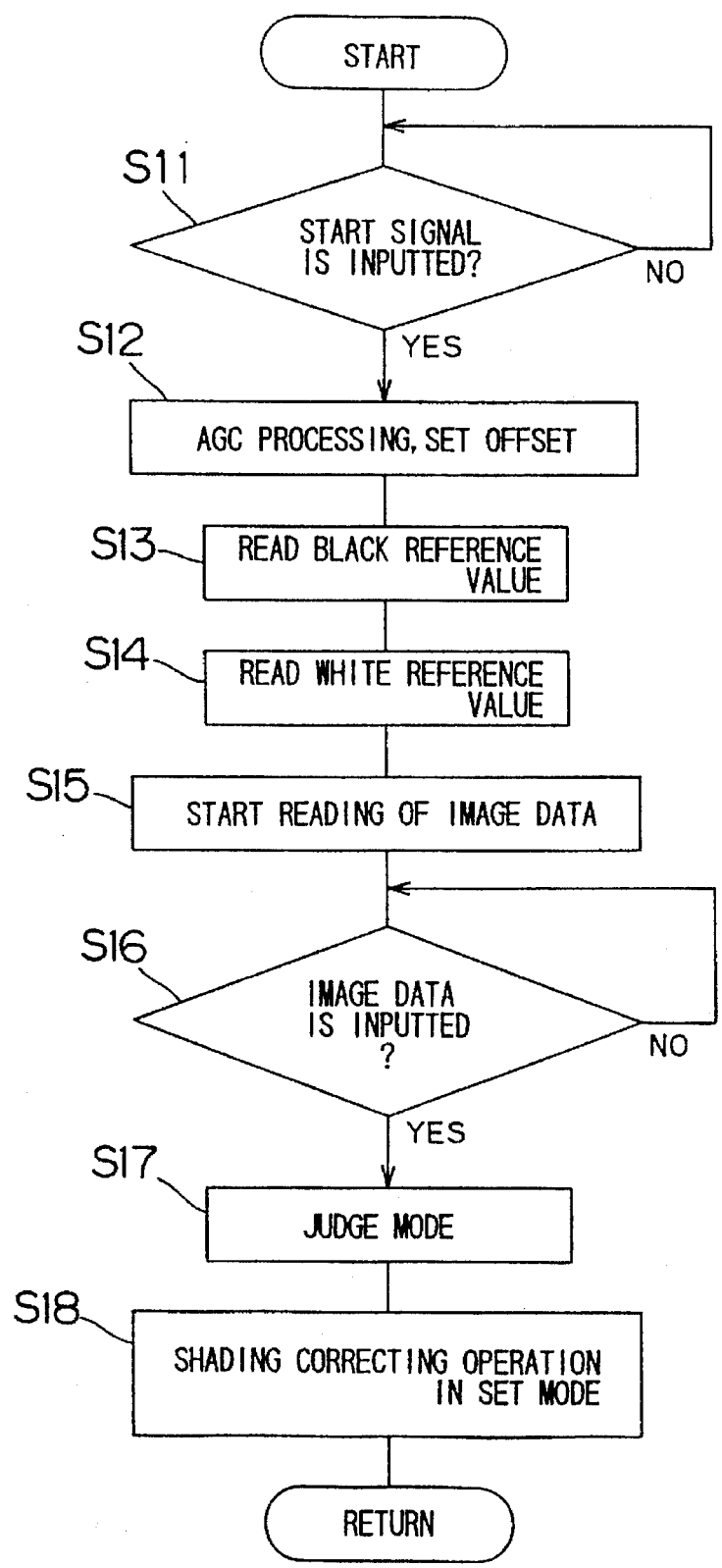
FIG. 5 is a flow chart for explaining another example of processing operations performed by the shading correcting circuit shown in FIG. 2.

FIG. 5 is a flow chart for explaining the other processing operations performed by the shading correcting circuit 4 shown in FIG. 2.

Referring now to FIG. 5, another example of the processing operations performed in the shading correcting circuit 4 shown in FIG. 2 will be described.

When a document is transmitted by the facsimile, the document is set in the set position and then, a transmission start button is depressed to input a start signal.

In the facsimile, if it is judged that the start signal is inputted (step S11), the lamp 25 is first turned on to illuminate the white reference plate 24, and reflected light from the white reference plate 24 is read by the CCD 26, a read output of the CCD 26 is applied through the input interface unit 2 to the digital AGC circuit 3, where the gain control of an input signal (AGC processing) is carried out. The minimum value of the signal which is subjected to the AGC processing is stored as an offset in the offset storing register 35 in the shading correcting circuit 4 (step S12).

The processing in the step S12 may be replaced with the processing in the steps S2 to S5 shown in FIG. 3.

The reflected light from the white reference plate 24 is then read in a state where the lamp 25 is turned off. Since the white reference plate 24 is not illuminated in this case, there is no reflected light from the white reference plate 24. Accordingly, black reference data is obtained by the CCD 26. The obtained data is processed in the input interface unit 2 and the digital AGC circuit 3, after which the processed data is stored as a black reference value in the black reference value register 32 (step S13).

The lamp 25 is then turned on to illuminate the white reference plate 24, and reflected light from the white reference plate 24 at that time is read by the CCD 26. Data obtained by the reading is processed in the input interface unit 2 and the digital AGC circuit 3, after which the processed data is stored as a white reference value in the white reference value register 31 (step S14).

As each of the black reference value and the white reference value in the steps S13 and S14 are determined, the average value of data corresponding to one line or a plurality of predetermined lines (for example, eight lines) read by the CCD 26 is used. The reason for this is that the black reference value and the white reference value are stabilized by using the average value of the line data. However, the black reference value may be the maximum value of the data read by the CCD 26, and the white reference value may be the minimum value of the data read by the CCD 26.

Processing in the steps S13 and S14 may be replaced with the processing in the steps S6 and S7 in FIG. 3.

The roller 21 is then driven to start the conveyance of the document, and the reading of the document is started in synchronism with the conveyance (step S15). As a result, image data of the document are sequentially read by the CCD 26, and the read image data is processed in the input interface unit 2 and the digital AGC circuit 3, after which the processed image data is applied to the shading correcting circuit 4.

In the shading correcting circuit 4, if the image data is inputted (step S16), the set mode is judged (step S17), and any one of the following computing equations (A) to (D) is selected depending on the set mode to execute a shading correcting operation based on the selected computing equation (step S18):

$$SOUT = \frac{I.D. - (\text{white reference value} + \text{OFFSET})}{\text{black reference value} - (\text{white reference value} + \text{OFFSET})} \times \text{number of gray levels} \quad (A)$$

$$SOUT = \frac{I.D. - (\text{white reference value} + \text{OFFSET})}{\text{black reference value} - (\text{white reference value} - \text{OFFSET})} \times \text{number of gray levels} \quad (B)$$

$$SOUT = \frac{I.D. - \text{white reference value}}{\text{black reference value} - (\text{white reference value} + \text{OFFSET})} \times \text{number of gray levels} \quad (C)$$

$$SOUT = \frac{I.D. - \text{white reference value}}{\text{black reference value} - (\text{white reference value} - \text{OFFSET})} \times \text{number of gray levels} \quad (D)$$

Specifically, a shading correcting operation is performed on the basis of the equation (A) if the set mode is a mode O, a shading correcting operation is performed on the basis of the equation (B) if the set mode is a mode 1, a shading correcting operation is performed on the basis of the equation (C) if the set mode is a mode 2, and a shading correcting operation is performed on the basis of the equation (D) if the set mode is a mode 3.

The mode O is a mode in which normal shading correction data is outputted. The equation (A) used at this time is substantially the same as the foregoing equation (2). In addition, the mode 1 is a mode in which image data after the shading correction is shifted toward the black side. The mode 2 is a mode in which the number of gray levels on the black side of image data after the shading correction is increased. The mode 3 is a mode in which image data after shading correction is shifted toward the white side. Although in the present embodiment, any one of the four modes can be selected, a mode other than the above described modes may be previously set and selected.

For reference, input image data I.D in each of the modes, data after shading correction SOUT, and the difference (a correcting amount) between the data after shading correction and the input image data are listed in Table 1.

TABLE 1

| I. D DECIMAL NUMERAL | MODE 0 | | MODE 1 | | MODE 2 | | MODE 3 | |
|---|---|---|---|---|---|---|---|---|
| | SOUT | SOUT I. D | SOUT | SOUT I. D | SOUT | SOUT I. D | SOUT | SOUT I. D |
| 240 | 255.0 | 15.0 | 255.0 | 15.0 | 255.0 | 15.0 | 238.9 | −1.1 |
| 224 | 236.3 | 12.3 | 238.9 | 14.9 | 255.0 | 32.0 | 221.9 | −2.1 |
| 208 | 216.6 | 8.6 | 221.9 | 13.9 | 236.3 | 28.3 | 204.8 | −3.2 |
| 192 | 196.9 | 4.9 | 204.8 | 12.8 | 216.6 | 24.6 | 187.7 | −4.3 |
| 176 | 177.2 | 1.2 | 187.7 | 11.7 | 196.9 | 20.9 | 170.7 | −5.3 |
| 160 | 157.5 | −2.5 | 170.0 | 10.7 | 177.2 | 17.2 | 153.6 | −6.4 |
| 144 | 137.8 | −6.2 | 153.6 | 9.6 | 157.5 | 13.5 | 136.5 | −7.5 |
| 128 | 118.2 | −9.8 | 137.5 | 8.5 | 137.8 | 9.8 | 119.5 | −8.5 |
| 112 | 98.5 | −13.5 | 119.5 | 7.5 | 118.2 | 6.2 | 102.4 | −9.6 |
| 96 | 78.8 | −17.2 | 102.4 | 6.4 | 98.5 | 2.5 | 85.3 | −10.6 |
| 80 | 59.1 | −20.9 | 85.3 | 5.3 | 78.8 | −1.2 | 68.3 | −11.7 |
| 64 | 39.4 | −24.6 | 68.3 | 4.3 | 59.1 | −4.9 | 51.2 | −12.8 |
| 48 | 19.6 | −28.3 | 51.2 | 3.2 | 39.4 | −8.6 | 34.1 | −13.9 |
| 32 | 0.0 | −32.0 | 34.1 | 2.1 | 19.7 | −12.3 | 17.1 | −14.9 |
| 16 | 0.0 | −16.0 | 17.1 | 1.1 | 0.0 | −16.0 | 0.0 | −16.0 |

Table 1 shows an example of a shading correcting operation in a case where the black reference value, the white reference value and the offset are set as follows:

black reference value=240 white reference value=16

OFFSET=16

The offset OFFSET may be an arbitrary value, provided that OFFSET≦white reference value.

Figure 6:
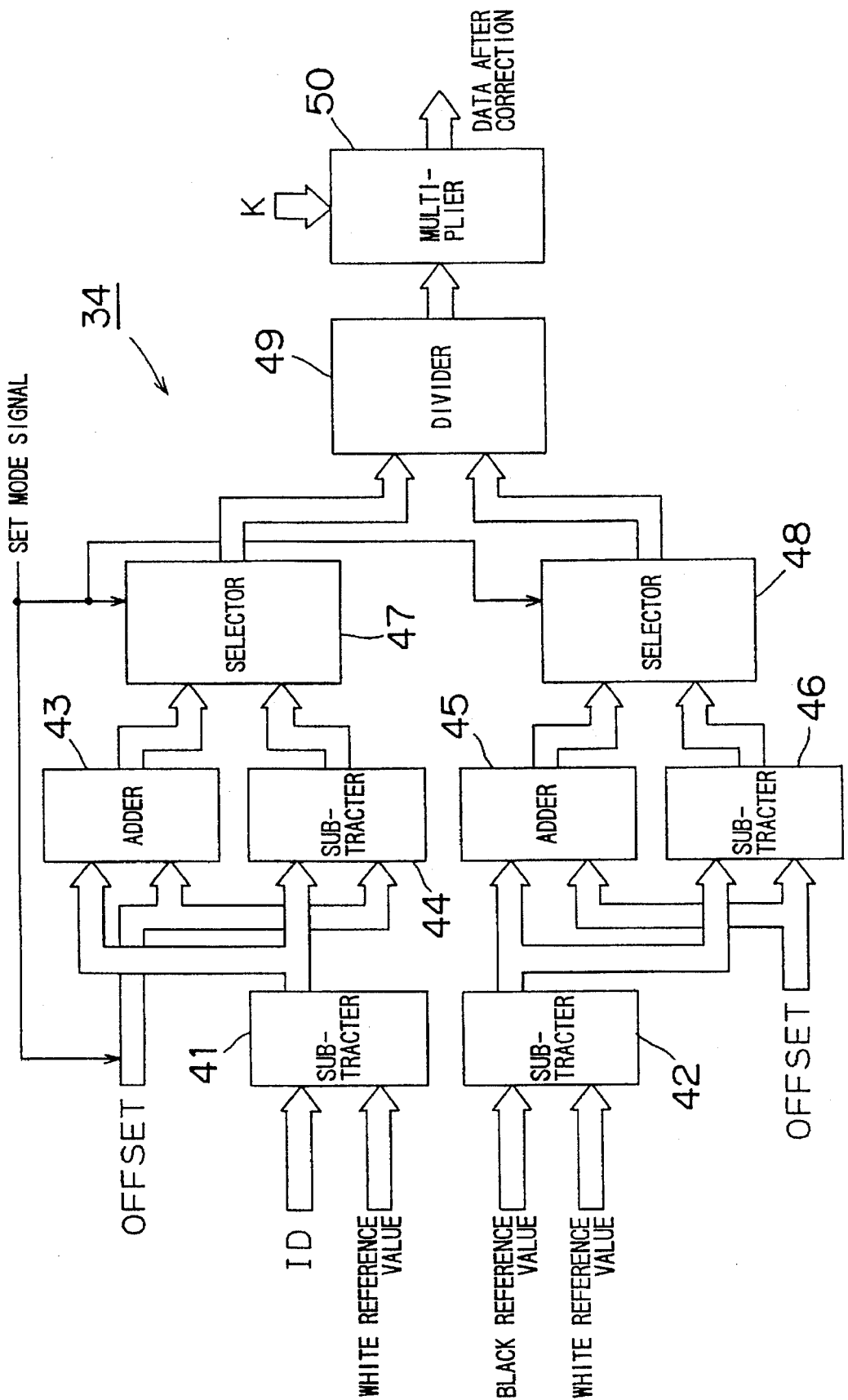
FIG. 6 is a block diagram showing another example of the construction of the shading correcting circuit, which is one example of a so-called hardware configuration.
Figure 7:
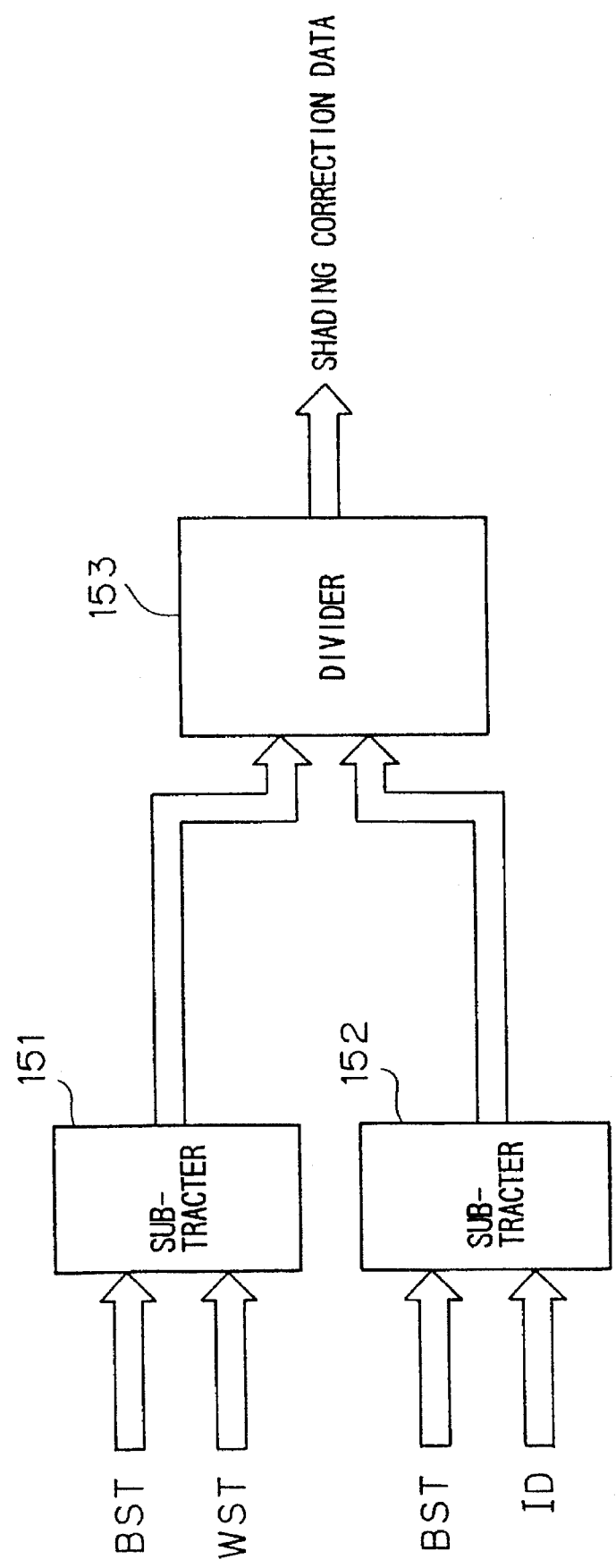
FIG. 7 is a block diagram showing the construction of a conventional shading correcting circuit.
Figure 8:
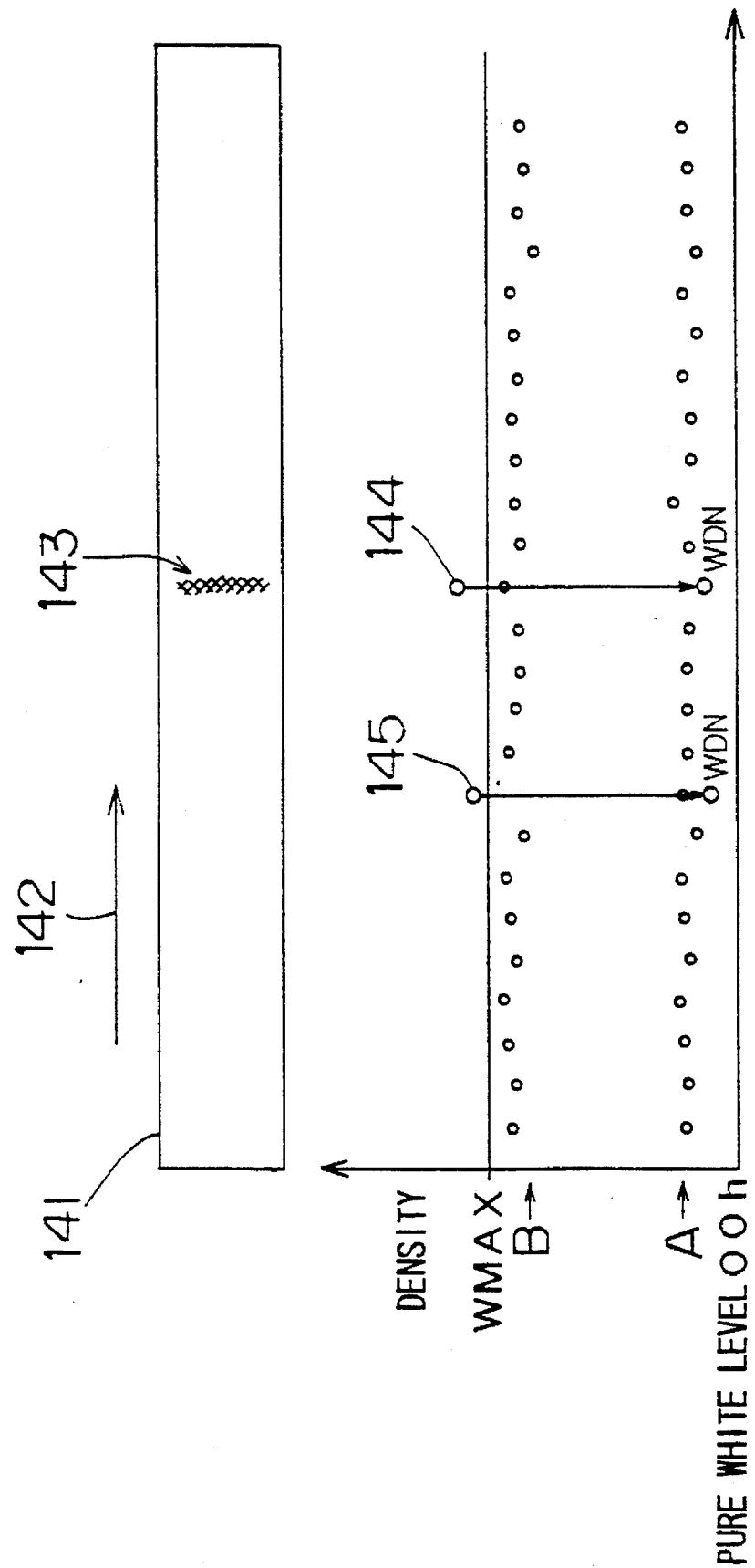
FIG. 8 is an illustration for explaining a problem which arises when a white reference plate becomes dirty in shading correction.

FIG. 6 is a block diagram showing another example of the construction of the operating section 34 in the shading correcting circuit 4. The operating section 34 in FIG. 6 is constituted by a so-called hardware circuit using a subtracter, an adder, a divider, a multiplier and a selector.

Referring to FIG. 6, at the time of the shading correcting operation, image data ID to be inputted and a white reference value stored in the white reference value register 31 (see FIG. 2) are applied to a subtracter 41, where the white reference value is subtracted from the image data ID. In addition, a black reference value stored in the black reference value register 32 (see FIG. 2) and a white reference value stored in the white reference value register 31 are applied to a subtracter 42, where the white reference value is subtracted from the black reference value.

An output of the subtracter 41 is applied to an adder 43 and a subtracter 44. In the adder 43, an offset OFFSET and an output of the subtracter 41 are added. On the other hand, in the subtracter 44, the offset OFFSET is subtracted from the output of the subtracter 41.

On the other hand, an output of the subtracter 42 is applied to an adder 45 and a subtracter 46. In the adder 45, the output of the subtracter 42 and an offset OFFSET are added. On the other hand, in the subtracter 46, the offset OFFSET is subtracted from the output of the subtracter 42.

Numerators (dividends) in the foregoing equations (1) to (4) are calculated in outputs of the adder 43 and the subtracter 44, while denominators (divisors) are calculated in outputs of the adder 45 and the subtracter 46.

The output of the adder 43 or the output of the subtracter 44 is selected by a selector 47, and the selected output is applied to a divider 49. Similarly, the output of the adder 45 or the output of the subtracter 46 is selected by a selector 48, and the selected output is applied to the divider 49. In the divider 49, the output selected by the selector 47 is divided by the output selected by the selector 48, and the result of the division is applied to a multiplier 50, where the result is multiplied by the number of gray levels K. An output of the multiplier 50 becomes data which has been subjected to shading correction.

In the above described construction, the selector 47 selects the output of the adder 43 or the output of the subtracter 44 on the basis of the set mode. Similarly, the selector 48 selects the output of the adder 45 or the output of the subtracter 46 on the basis of the set mode. Therefore, a set mode signal is applied to the selector 47 and the selector 48. In addition, the set mode signal is also used for determining whether or not the offset OFFSET is to be applied to the adder 43 or the subtracter 44. The reason for this is that if the set mode is the mode 2 or the mode 3, a shading correcting operation based on the foregoing computing equation (C) or (D) is performed, whereby the denominator in the equation includes no offset OFFSET.

As a result of the foregoing, the shading correcting operation based on any one of the foregoing equations (A) to (D) can be also performed by the circuit shown in FIG. 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a shading correcting apparatus for correcting data of a plurality of pixels read by line reading means using a white reference value and a black reference value which are set for each pixel and a predetermined offset, the shading correcting apparatus comprising:

holding means holding a low threshold value WMAX1, a high threshold value WMAX2 and a white reference value correcting value WDN for producing a reference value, and an offset OFFSET;

line reading means for optically reading a plurality of pixels in a predetermined direction of horizontal scanning and outputting data of the plurality of pixels;

a density reference plate extending in the direction of horizontal scanning which is arranged in a position where the line reading means can read the pixels;

illuminating means for illuminating the density reference plate;

comparing means for causing the line reading means to read the density reference plate illuminated by the illuminating means and detecting the maximum value AGCMAX of the outputted data of the plurality of pixels to compare the value AGCMAX with the low threshold value WMAX1 and the high threshold value WMAX2 which are held in said holding means;

correcting means for making such correction that the white reference value correcting value WDN held in the holding means becomes higher and the low threshold value WMAX1 held in the holding means becomes higher when the result of the comparison by the comparing means is WMAX1<AGCMAX<WMAX2; and white reference value producing means for producing a white reference value for each pixel on the basis of said low threshold value WMAX1, said white reference value correcting value WDN and data for a white reference value outputted from said line reading means.

2. The shading correcting apparatus according to claim 1, wherein said holding means further holds a threshold value for a black reference value BMIN for judging whether or not a black reference value should be corrected and a black reference value correcting value BUP, and further comprising black reference value producing means for producing a black reference value for each pixel on the basis of said threshold value for a black reference value BMIN, the black reference value correcting value BUP and data for a black reference value outputted from the line reading means.

3. The shading correcting apparatus according to claim 2, wherein said black reference value producing means sets, if the value of the pixel read by said line reading means is higher than the threshold value for a black reference value BMIN, the value as a black reference value, while setting, if it is lower than the threshold value BMIN, the black reference value correcting value BUP as a black reference value.

4. The shading correcting apparatus according to claim 1, wherein said white reference value producing means sets, if the value of the pixel read by said line reading means is lower than the low threshold value WMAX1, the value as a white reference value, while setting, if it is higher than the low threshold value WMAX1, the white reference value correcting value WDN as a white reference value.

5. The shading correcting apparatus according to claim 4, wherein said holding means further holds a threshold value for a black reference value BMIN for judging whether or not a black reference value should be corrected and a black reference value correcting value BUP, and further comprising black reference value producing means for producing a black reference value for each pixel on the basis of said threshold value for a black reference value BMIN, said black reference value correcting value BUP and data for a black reference value outputted from the line reading means.

6. The shading correcting apparatus according to claim 5, wherein said black reference value producing means sets, if the value of the pixel read by said line reading means is higher than the threshold value for a black reference value BMIN, the value as a black reference value, while setting, if it is lower than the threshold value BMIN, the black reference value correcting value BUP as a black reference value.

7. A shading correcting apparatus for subjecting inputted image data to a predetermined correction, comprising:

reading means for reading image data from an image data reading section;

illuminating means for illuminating the image data reading section;

a density reference plate provided in the image data reading section;

offset holding means for causing the reading means to read reflected light from the density reference plate in a case where the density reference plate is illuminated by the illuminating means to hold a value obtained by the reading as an OFFSET;

black reference value holding means for causing the reading means to read reflected light from the density reference plate in a case where the density reference plate is not illuminated by the illuminating means to hold a value obtained by the reading as a black reference value;

white reference value holding means for causing the reading means to read reflected light from the density reference plate in a case where the density reference plate is illuminated by the illuminating means to hold a value obtained by the reading as a white reference value; and correcting means for causing the illuminating means to illuminate a document positioned in the image data reading section and causing the reading means to read image data of the document, to correct the image data of the document read by the reading means in accordance with a set mode signal and its selection of one of the following four computing equations (A) to (D) using the OFFSET held in said offset holding means, the black reference value held in the black reference value holding means and the white reference value held in the white reference value holding means:

$$SOUT = \frac{I.D. - (\text{white reference value} + \text{OFFSET})}{\text{black reference value} - (\text{white reference value} + \text{OFFSET})} \times \text{number of gray levels} \quad (A)$$

$$SOUT = \frac{I.D. - (\text{white reference value} + \text{OFFSET})}{\text{black reference value} - (\text{white reference value} - \text{OFFSET})} \times \text{number of gray levels} \quad (B)$$

$$SOUT = \frac{I.D. - \text{white reference value}}{\text{black reference value} - (\text{white reference value} + \text{OFFSET})} \times \text{number of gray levels} \quad (C)$$

$$SOUT = \frac{I.D. - \text{white reference value}}{\text{black reference value} - (\text{white reference value} - \text{OFFSET})} \times \text{number of gray levels}. \quad (D)$$

8. The shading correcting apparatus according to claim 7, wherein said offset holding means causes the reading means to read the reflected light from the density reference plate in a case where the density reference plate is illuminated by the illuminating means to hold as an OFFSET the minimum value of the average value of data corresponding to a predetermined number of lines obtained by the reading means.

9. The shading correcting apparatus according to claim 8, wherein said reading means comprises a line sensor, said black reference value is the average value of the data corresponding to a predetermined number of lines read by the line sensor, and said white reference value is the average value of the data corresponding to a predetermined number of lines read by the line sensor.

10. The shading correcting apparatus according to claim 7, wherein said reading means comprises a line sensor, said black reference value is the average value of the data corresponding to a predetermined number of lines read by the line sensor, and said white reference value is the average value of the data corresponding to a predetermined number of lines read by the line sensor.

11. A shading correcting method comprising the steps of:

inputting image data; and subjecting said inputted image data to shading correction in accordance with one of the following four computing equations (A) to (D) based upon a selected mode and said equations using a predetermined white reference value, a predetermined black reference value and a predetermined OFFSET:

$$SOUT = \frac{I.D. - (\text{white reference value} + \text{OFFSET})}{\text{black reference value} - (\text{white reference value} + \text{OFFSET})} \times \text{number of gray levels} \quad (A)$$

$$SOUT = \frac{I.D. - (\text{white reference value} + \text{OFFSET})}{\text{black reference value} - (\text{white reference value} - \text{OFFSET})} \times \text{number of gray levels} \quad (B)$$

$$SOUT = \frac{I.D. - \text{white reference value}}{\text{black reference value} - (\text{white reference value} + \text{OFFSET})} \times \text{number of gray levels} \quad (C)$$

$$SOUT = \frac{I.D. - \text{white reference value}}{\text{black reference value} - (\text{white reference value} - \text{OFFSET})} \times \text{number of gray levels}. \quad (D)$$

* * * * *